United States Patent
Joo

(10) Patent No.: US 6,419,049 B1
(45) Date of Patent: Jul. 16, 2002

(54) MAIN SHAFT BEARING LUBRICATING APPARATUS FOR SEALING-TYPE RECIPROCATING COMPRESSOR

(75) Inventor: Jae-Man Joo, Suwon (KR)

(73) Assignee: Samsung Kwangju Electronics Co., Ltd. (KR)

( * ) Notice: Subject to any disclaimer, the term of this patent is extended or adjusted under 35 U.S.C. 154(b) by 0 days.

(21) Appl. No.: 09/528,246

(22) Filed: Mar. 17, 2000

(30) Foreign Application Priority Data

Jun. 25, 1999 (KR) .............................................. 99-24284

(51) Int. Cl.⁷ ................................................. F01M 1/00
(52) U.S. Cl. ...................... 184/6.16; 384/123; 384/292; 384/305
(58) Field of Search .................. 184/6.16; 384/123, 384/292, 305

(56) References Cited

U.S. PATENT DOCUMENTS

| | | | | |
|---|---|---|---|---|
| 1,436,265 A | * | 11/1922 | Kingsbury et al. | 384/305 |
| 2,362,667 A | * | 11/1944 | Schmidt | 384/305 |
| 3,584,980 A | * | 6/1971 | Cawley | 230/206 |
| 3,687,233 A | * | 8/1972 | Greenwald | 184/6.18 |
| 3,895,689 A | * | 7/1975 | Swearingen | 184/6.16 |
| 3,951,573 A | * | 4/1976 | Dunning et al. | 417/424 |
| 4,063,853 A | * | 12/1977 | De Groat | 417/53 |
| 4,363,047 A | * | 12/1982 | Maruyama et al. | 360/107 |
| 4,394,114 A | * | 7/1983 | Maruyama et al. | 418/269 |
| 4,734,020 A | * | 3/1988 | Inaba et al. | 418/55 |
| 4,772,188 A | * | 9/1988 | Kimura et al. | 384/123 |
| 4,874,302 A | * | 10/1989 | Kobayashi et al. | 418/55 |
| 4,878,820 A | * | 11/1989 | Doi et al. | 418/203 |
| 5,701,668 A | * | 12/1997 | Dreiman et al. | 29/888.02 |
| 6,024,495 A | * | 2/2000 | Loos et al. | 384/305 |
| 6,045,266 A | * | 4/2000 | Mitsubori et al. | 384/305 |
| 6,132,094 A | * | 10/2000 | Cornelison et al. | 384/305 |

FOREIGN PATENT DOCUMENTS

| | | | | |
|---|---|---|---|---|
| DE | 3007501 | * | 9/1970 | 384/305 |
| GB | 158759 | * | 2/1921 | 384/305 |

\* cited by examiner

Primary Examiner—Chong H. Kim
(74) Attorney, Agent, or Firm—Burns, Doane, Swecker & Mathis, L.L.P.

(57) ABSTRACT

A main shaft bearing lubricating apparatus for a sealing-type reciprocating compressor having a rotor provided to a rotary shaft and rotating about the rotary shaft with respect to a main shaft bearing with a trust washer between, and a reciprocating piston connected to one front end of the rotary shaft through a crank, including a plurality of lubricating grooves formed on the main shaft bearing's front section and each having an intake point and an outlet point that are disposed on different positions by a given angle with respect to the main shaft bearing's center of rotation.

4 Claims, 7 Drawing Sheets

MAIN SHAFT BEARING LUBRICATING APPARATUS FOR SEALING-TYPE RECIPROCATING COMPRESSOR

BACKGROUND OF THE INVENTION

1. Field of the Invention

The present invention relates to a main shaft bearing lubricating apparatus for a sealing-type reciprocating compressor. More particularly, it relates to a main shaft bearing lubricating apparatus for a sealing-type reciprocating compressor that sufficiently provides a lubricating oil between a main shaft bearing and a thrust washer supporting a motor's rotor by preventing a metallic noise between the main shaft bearing and the rotor.

2. Discussion of Related Art

Compressors that are generally used in refrigerators, air conditioners, etc. are of sealing type in order to reduce noises. In such a compressor, as depicted in FIG. 5, a rotary shaft 102 is tightly fit into a motor's rotor 101 and turns as rotor 101 rotates. A connecting rod 103 is connected to rotary shaft 102's lower end, and a piston rod 104 of a compression cylinder 105 is eccentrically connected to connecting rod 103. Accordingly, as rotor 101 rotates by the rotation of the motor, the rotary shaft 102 rotates, and a piston rod 104, connected to connecting rod 103, reciprocates in response to the rotation of rotary shaft 102, thereby making a piston head 106 reciprocate. As piston head 106 reciprocates, an evaporating refrigerant, introduced to compression cylinder 105, is compressed and condensed. This sealing-type compressor's main shaft bearing 107, supporting the motor's rotor 101, is coupled to a block 108 via a bolt, etc., and an oil pickup 109 is joined to rotary shaft 102's lower end, and transfers a lubricating oil, held in a lubricating oil storage shell (not shown), to various operating parts including compression cylinder 105 and finally to main shaft bearing 107 by centrifugal force produced by rotor 101's turning. A thrust washer 110 is interposed between main shaft bearing 107 and rotor 101, and rotates along with rotor 101 directly supporting rotor 101's load. At least one straight lubricating groove 111 is formed on main shaft bearing 107's upper surface that contacts thrust washer 110, as shown in FIGS. 6 and 7, the groove 111 lying along a diameter of the bearing 107.

The lubricating oil that is picked up by oil pickup 109 and reaches main shaft bearing 102's upper surface flows to the outside of main shaft bearing 107 through lubricating grooves 111 by the centrifugal force of trust washer 110. As depicted in FIG. 6, in the conventional compressor, since the lubricating oil, elevated through main shaft bearing 107, flows to the outside of main shaft bearing 107 before it completely approaches a contact surface between main shaft bearing 107's front section and thrust washer 110, the lubricating oil does not exist between main shaft bearing 107 and trust washer 110, and does not provide the fluid lubricating characteristics.

Since the load of rotor 101 supported by main shaft bearing 107 is transmitted vertically downward, it is transferred to the upper surface of main shaft bearing 107 through thrust washer 110. That is, the weight of rotor 101 is sent to the upper surface of main shaft bearing 107 to cause friction. Since the lubricating oil is not sufficiently provided between main shaft bearing 107's upper surface and thrust washer 110's lower surface, a metallic friction is produced between main shaft bearing 107 and thrust washer 110, thus generating a frictional loss and abnormal noise of high frequency, and deteriorating the compressor quality.

SUMMARY OF THE INVENTION

An object of the present invention is to provide a main shaft bearing lubricating apparatus for a sealing-type reciprocating compressor which sufficiently provides a lubricating oil, transmitted to a main shaft bearing, to an upper surface of the main shaft bearing contacting a thrust washer, and makes a lubricating friction between the thrust washer and the main shaft bearing, thereby preventing a loss and abnormal noise due to a metallic friction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a main shaft bearing lubricating apparatus for a sealing-type reciprocating compressor having a rotor provided to a rotary shaft and rotating about the rotary shaft with respect to a main shaft bearing with a thrust washer therebetween, and a reciprocating piston connected to one front end of the rotary shaft through a crank, including a plurality of lubricating grooves formed on the main shaft bearing's front section and each having an intake point and an outlet point that are disposed on different positions by a given angle with respect to the main shaft bearing's center of rotation. An outlet face of each of the lubricating grooves is smaller than an intake face in unit area.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

Figure 1:
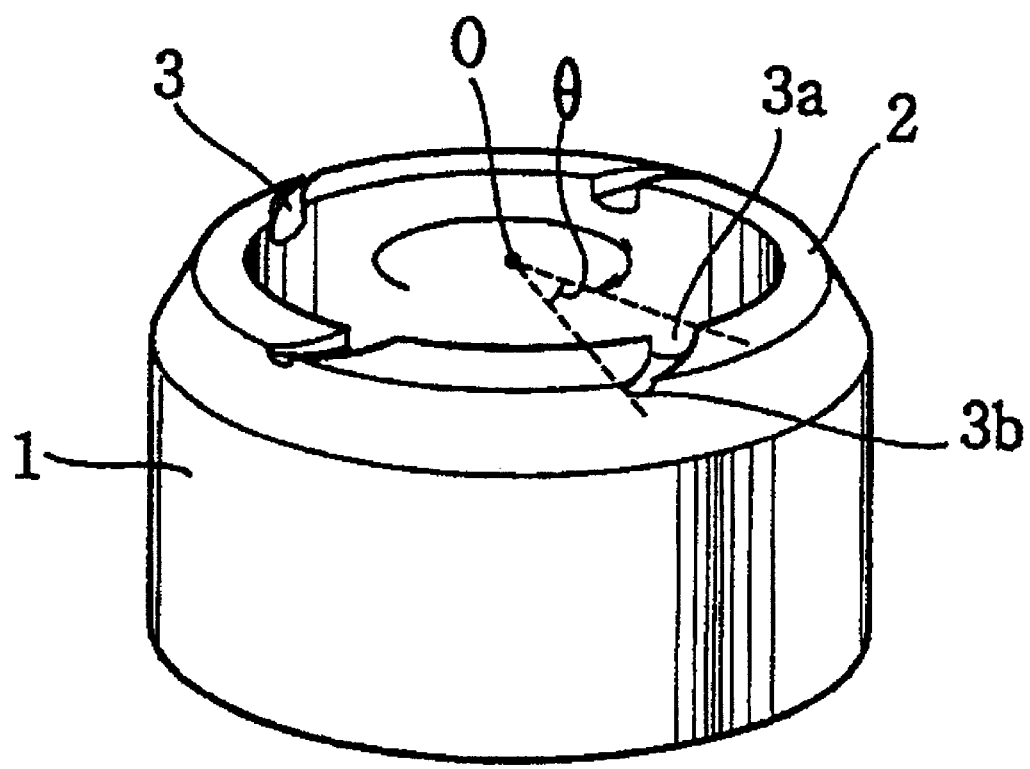
FIG. 1 is a perspective view of a main shaft bearing's upper section having a plurality of curved lubricating grooves in accordance with the present invention.

FIG. 1 depicts a plurality of lubricating grooves 3 formed to a given curvature in a rotating direction of a rotary shaft on a main shaft bearing 1's front section 2 in accordance with the present invention. More specifically, each groove 3 has an intake point 3a and an outlet point 3b disposed on different positions by a given angle θ with respect to main shaft bearing 1's center of rotation O to form a curved shape on a plane.

Figure 2:
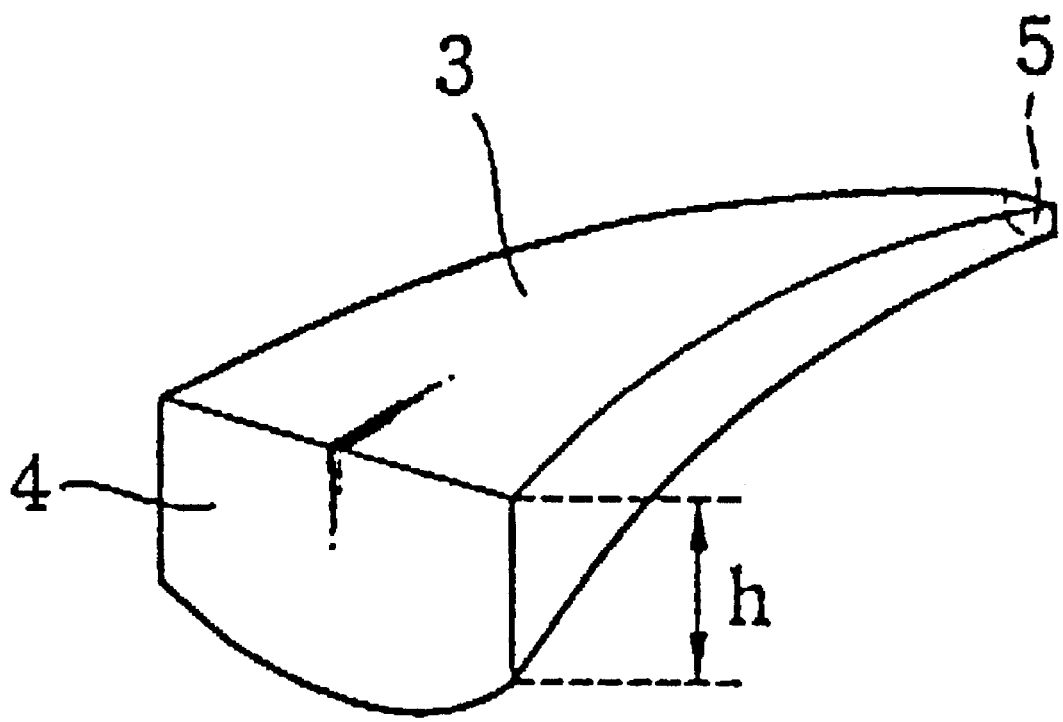
FIG. 2 is a perspective view of lubricating grooves in accordance with a first preferred embodiment of the present invention.
Figure 3:
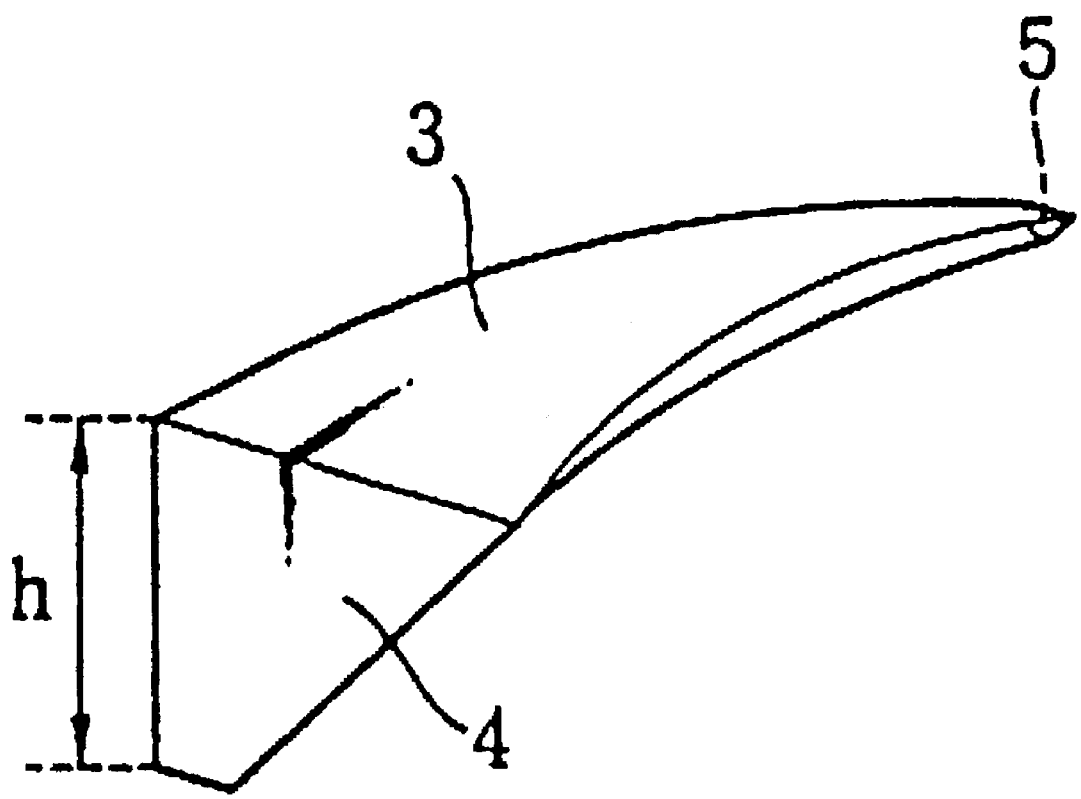
FIG. 3 is a perspective view of lubricating grooves in accordance with a second preferred embodiment of the present invention.
Figure 4:
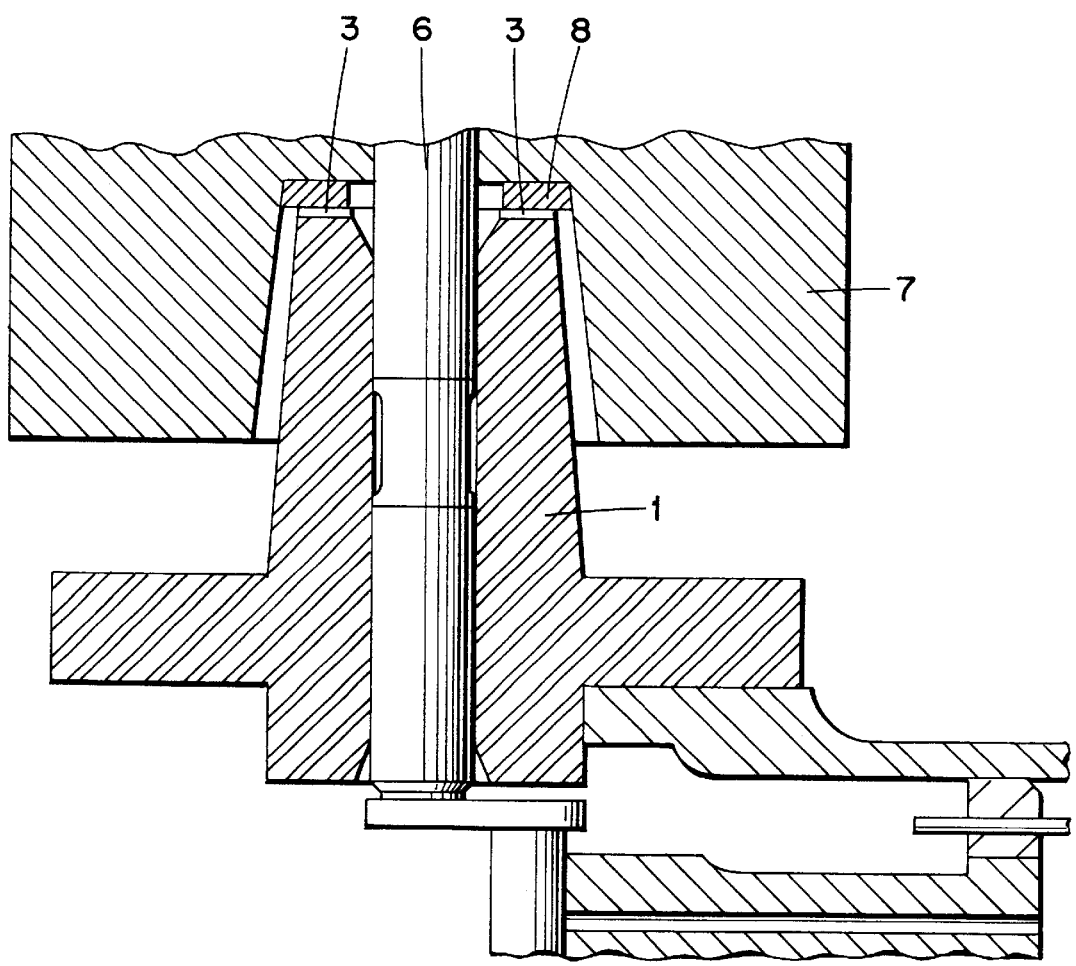
FIG. 4 is a partially enlarged sectional view of a rotor, thrust washer, and a main shaft bearing for a reciprocating compressor.
Figure 5:
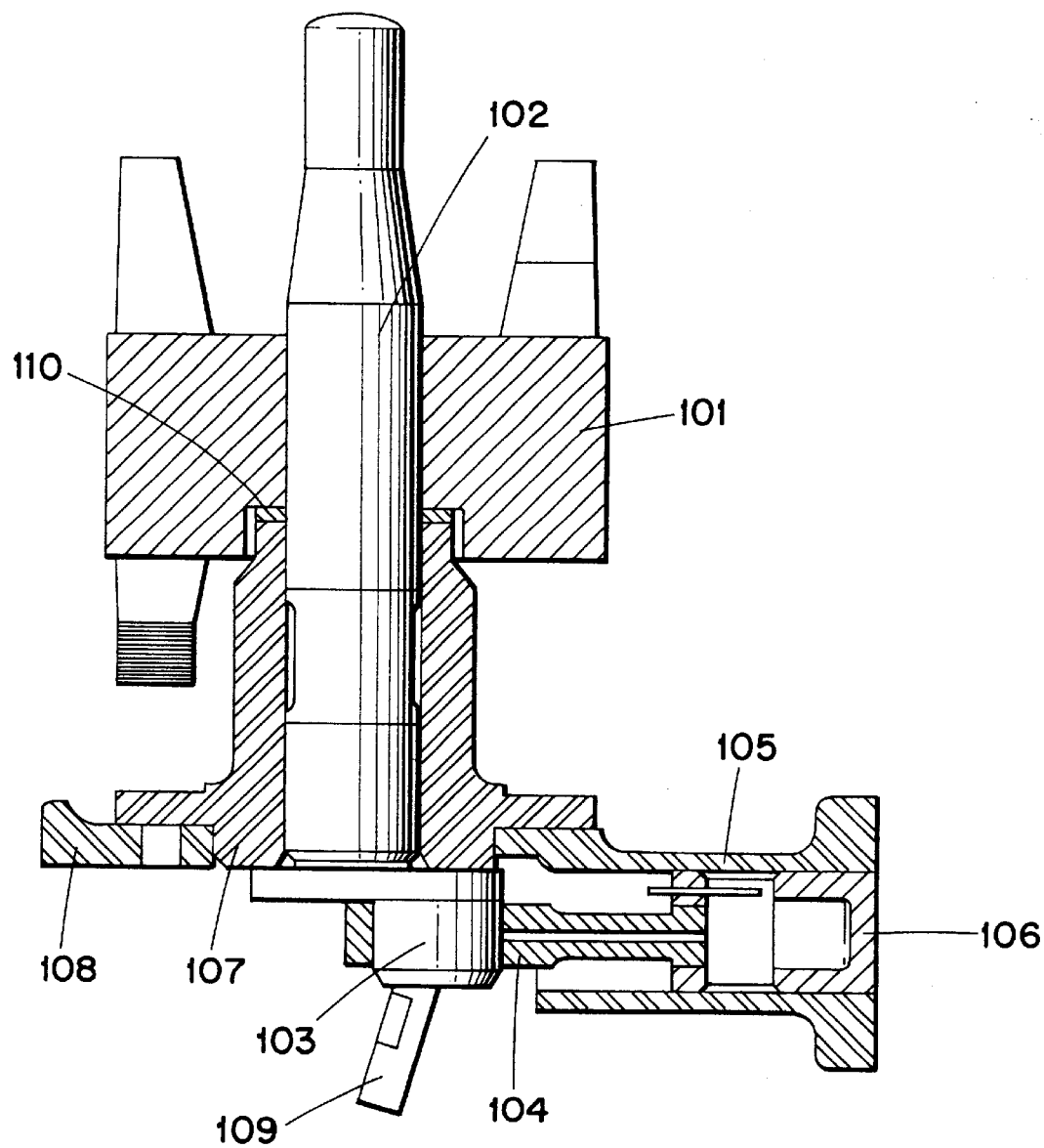
FIG. 5 is a sectional view of the internal structure of a conventional sealing-type reciprocating compressor.
Figure 6:
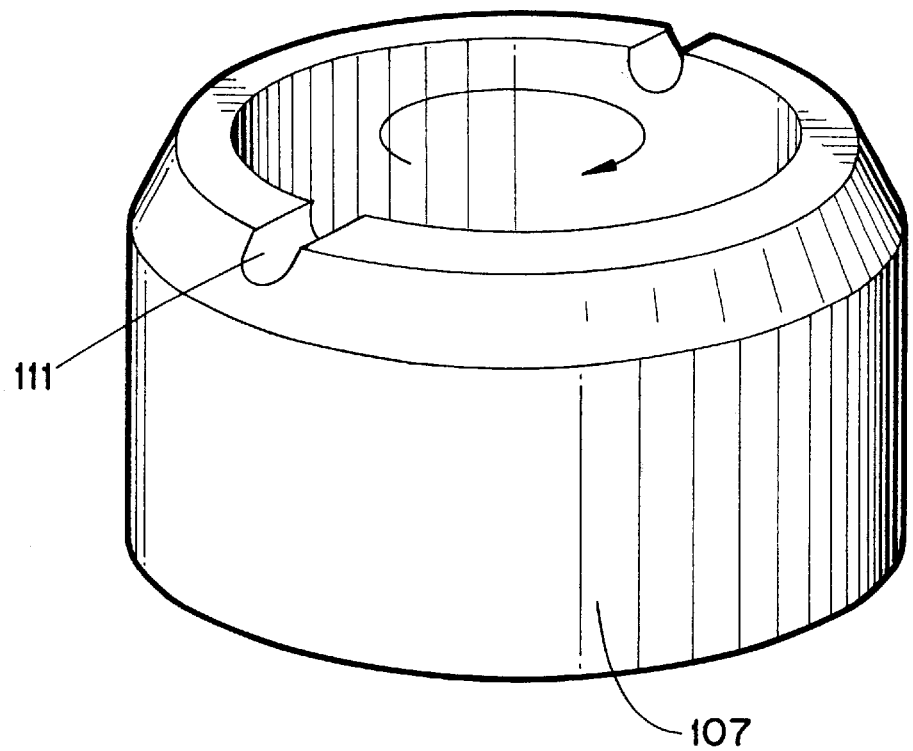
FIG. 6 is a perspective view of a main shaft bearing's upper section with lubricating grooves for the conventional sealing-type reciprocating compressor.
Figure 7:
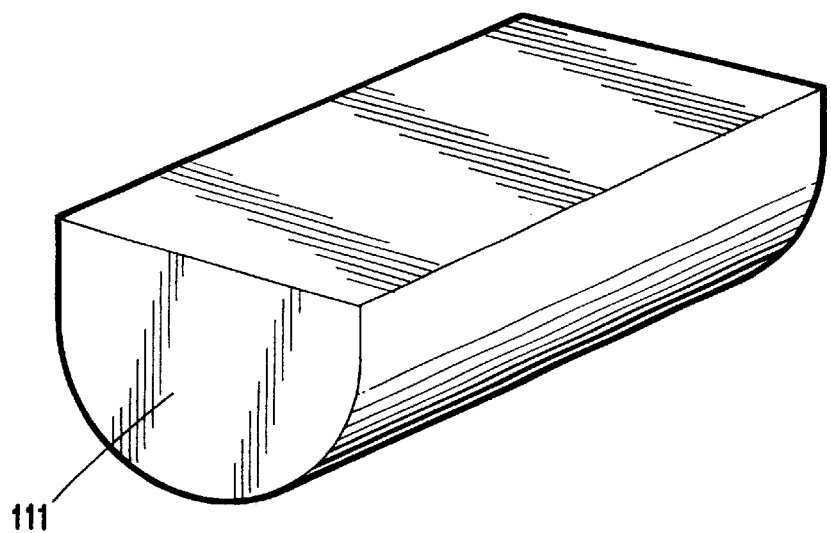
FIG. 7 is a perspective view of the structure of the lubricating grooves provided to the main shaft bearing of FIG. 6.

A line linking the intake and outlet points of lubricating groove 3 to each other may form a curved shape, as shown in FIGS. 2 and 3.

It is preferable that regarding lubricating groove 3's sectional shape, outlet face 5 is smaller than intake face 4 in unit area. For example, as depicted in FIG. 2 or 3, lubricating groove 3's sectional area may be narrow gradually. In addition, regarding depth h of lubricating groove 3, outlet face 5 may be lower than intake face 4, so the outlet of lubricating groove 3 is smaller than the intake in unit area. Main shaft bearing 1 of the present invention with such lubricating grooves 3 supports a rotary shaft 6, as shown in FIG. 1, and a lubricating oil, introduced through rotary shaft 6 from a lubricating oil storage shell by a centrifugal suction force produced by the rotation of rotary shaft 6, is elevated along main shaft bearing 1's inside and then reaches its front section 2.

The lubricating oil, reaching main shaft bearing 1's front section 2, receives the centrifugal force produced by the rotating force of thrust washer 8 interposed between rotor 7 and main shaft bearing 1, and flows to the outside in the direction of the semi-diameter through lubricating grooves 3 formed on main shaft bearing 1's front section 2.

As described above, since the unit area of outlet face 5 is smaller than intake face 4's, the amount of the lubricating oil introduced through intake face 4 of lubricating groove 3 is smaller than that of the lubricating oil that flows out through outlet face 5.

Therefore, because the lubricating oil continuously flows into intake face 4 of lubricating grooves 3 while the flowing speed of the lubricating oil in lubricating grooves 3 becomes low, the lubricating oil stagnant in lubricating grooves 3 overflows front section 2 of main shaft bearing 1, and is introduced between main shaft bearing 1 and thrust washer 8, thus forming a lubricating film.

The lubricating friction is created between thrust washer 8 and main shaft bearing 1 sufficiently provided with the lubricating oil whereby a metallic friction is not produced to minimize the frictional force and noises due to the metallic friction.

In order to make the lubricating oil in lubricating grooves 3 slowly flow, each they groove 3's section may be either symmetric (as shown in FIG. 2'), or asymmetric (as shown in FIG. 3). It is preferable that the contact surface between main shaft bearing 1's front section 2 and thrust washer 8 is processed enough to make the lubricating oil be evenly distributed.

Figure 8:
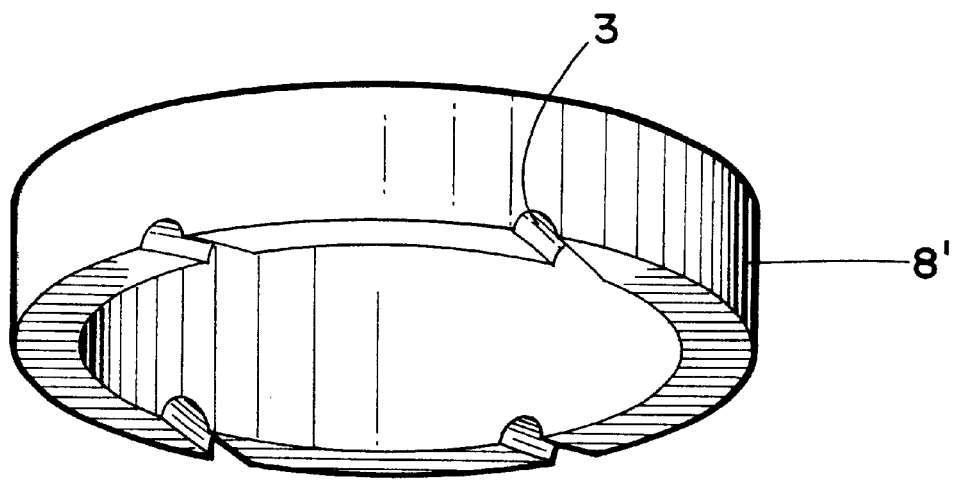
FIG. 8 depicts a thrust washer having grooves according to the present invention.

Lubricating grooves 3' may be additionally formed on thrust washer 8's bottom surface so that the function of lubricating grooves 3 shown as grove 3' in FIG. 8, can be provided to thrust washer 8 thereby enhancing the lubricating characteristics.

As described above, according to the present invention, the lubricating oil is sufficiently provided to the main shaft bearing and the thrust washer, and the lubricating friction is created between the main bearing and the thrust washer whereby a big frictional resistance is not produced and the noise problem due to the metallic friction is prevented to enhance the quality of the compressor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A reciprocating compressor comprising:

a rotatable rotor;

a shaft connected to and rotatable with the rotor in a direction of rotation about an axis of the shaft;

a main shaft bearing in which the shaft is rotatably supported;

a crank mounted on the shaft;

a cylinder;

a piston slidably disposed in the cylinder and operably connected to the crank to be reciprocated thereby within the cylinder to compress fluid;

a thrust washer disposed axially between a front end face of the main shaft bearing and a surface of the rotor; and a lubrication system for circulating liquid lubricant along the shaft to the front end face of the main shaft bearing;

the front end face of the main shaft bearing including grooves formed therein, each groove extending from an inlet disposed at a radially inner periphery of the front end face to an outlet disposed at a radially outer periphery thereof;

the inlet lying on a first radius of the front end face, and the outlet lying on a second radius of the front end face;

the second radius forming an angle with the first radius and disposed ahead of the first radius with reference to the direction of rotation;

a cross-section of each groove becoming smaller in a direction toward the outlet.

2. The reciprocating compressor according to claim 1 wherein each groove is curved from its inlet to its outlet.

3. The reciprocating compressor according to claim 1 wherein a height of the inlet measured in a direction parallel to the axis of rotation is greater than a height of the outlet.

4. The reciprocating compressor according to claim 1 wherein the thrust washer includes a rear surface facing the front end face of the main shaft bearing, wherein the rear surface also includes the grooves.

* * * * *